US012585923B2

(12) United States Patent
Lin et al.

(10) Patent No.: US 12,585,923 B2
(45) Date of Patent: Mar. 24, 2026

(54) DESPARSIFIED CONVOLUTION FOR SPARSE ACTIVATIONS

(71) Applicant: QUALCOMM Incorporated, San Diego, CA (US)

(72) Inventors: Jamie Menjay Lin, San Diego, CA (US); Jian Shen, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 834 days.

(21) Appl. No.: 17/817,552

(22) Filed: Aug. 4, 2022

(65) Prior Publication Data

US 2024/0046078 A1     Feb. 8, 2024

(51) Int. Cl.
G06N 3/048          (2023.01)

(52) U.S. Cl.
CPC ..................................... G06N 3/048 (2023.01)

(58) Field of Classification Search
CPC ...................................................... G06N 3/048
See application file for complete search history.

(56) References Cited

U.S. PATENT DOCUMENTS

| | | | | |
|---|---|---|---|---|
| 10,970,619 B1 * | 4/2021 | Xiao | ....................... | G06N 3/045 |
| 11,586,417 B2 * | 2/2023 | Hill | ........................... | G06F 5/06 |

| | | | | |
|---|---|---|---|---|
| 2020/0104692 A1 | 4/2020 | Hill et al. | | |
| 2021/0042127 A1 * | 2/2021 | Koneru | ................. | G06F 9/3001 |
| 2021/0303967 A1 * | 9/2021 | Bender | ..................... | G06N 3/08 |
| 2022/0103761 A1 * | 3/2022 | Wu | ......................... | G06N 3/048 |
| 2022/0147826 A1 * | 5/2022 | Xiao | ....................... | G06N 3/082 |
| 2022/0164652 A1 * | 5/2022 | Aytekin | ................. | G06V 10/82 |
| 2023/0016455 A1 * | 1/2023 | Palla | ........................ | G06N 3/08 |
| 2023/0177321 A1 * | 6/2023 | Sanchez | ................. | G06N 3/063 |
| | | | | 706/33 |
| 2023/0259743 A1 * | 8/2023 | Sanchez | ............... | G06N 3/0464 |
| | | | | 706/27 |
| 2023/0368030 A1 * | 11/2023 | Raha | ........................ | G06N 3/09 |
| 2024/0028895 A1 * | 1/2024 | Raha | ........................ | G06N 3/09 |

OTHER PUBLICATIONS

Albericio J., et al., "Cnvlutin: Ineffectual-Neuron-Free Deep Neural Network Computing", 2013, 21st International Conference on Program Comprehension, International Symposium on Computer Architecture, IEEE, US, Jun. 18, 2016, pp. 1-13, XP032950644, abstract, figures 3, 4, 5, 6(b), 7, 8 I, lines 39-43, III-B, lines 1-2, III-B, lines 6-8, III-B, lines 10-12, III-B, lines 25-28, III-C, lines 4-6.III-C, lines 12-13, III-C, lines 19-35, IV-A, IV-B, lines 7-10, IV-B1, IV-B3, VII, lines 1-5.

(Continued)

*Primary Examiner* — Mohammed H Zuberi
(74) *Attorney, Agent, or Firm* — Patterson & Sheridan LLP

(57)          ABSTRACT

Certain aspects of the present disclosure provide techniques for desparsified convolution. An activation tensor is received, and a convolution output is generated for the activation tensor, comprising: selecting a subset of weight elements, corresponding to a set of non-zero elements in the activation tensor, from a weight tensor, and multiplying the set of non-zero elements and the set of weight elements.

30 Claims, 8 Drawing Sheets

(56) References Cited

OTHER PUBLICATIONS

Dave S., et al., "Hardware Acceleration of Sparse and Irregular Tensor Computations of ML Models: A Survey and Insights", Arxiv.Org, Cornell University Library, 201 Olin Library Cornell University Ithaca, NY 14853, Jul. 22, 2021, 44 pages, XP081999518, abstract Sections I-IX, XIII-XV.

International Search Report and Written Opinion—PCT/US2023/067696—ISA/EPO—Sep. 20, 2023.

Szegedy C., et al., "Going Deeper with Convolutions", Computer Vision and Pattern Recognition, Sep. 17, 2014, pp. 1-12, XP055230968, retrieved on Nov. 24, 2015.

Wang D., et al., "An Inference Accelerator Design for Sparse Convolution Neural Network", 2021 IEEE International Conference on Computer Science, Electronic Information Engineering and Intelligent Control Technology (CEI), IEEE, Sep. 24, 2021, pp. 498-515, XP034001313, The Whole Document.

Elsen E., et al., "Fast Sparse ConvNets", arXiv: 1911.09723v1 [cs.CV], Nov. 21, 2019, pp. 1-12.

\* cited by examiner

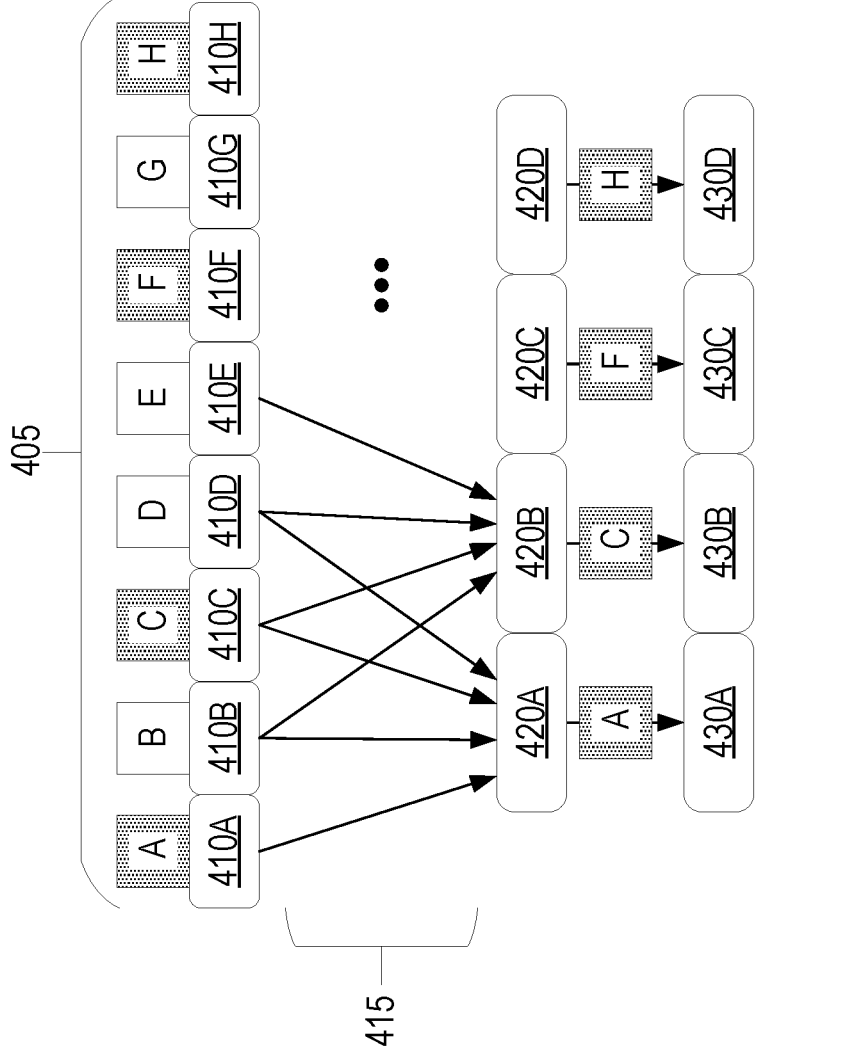
*FIG. 4*

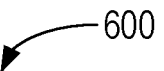

600

605 — Select a kernel position for convolution

610 — Extract a slice from input tensor

615 — Identify non-zero element(s) in slice

620 — Identify corresponding weight element(s)

625 — Generate intermediate tensor for slice

630 — Additional slice(s)?

Yes

No

635 — Aggregate intermediate tensors to generate a convolution output

640 — Convolution complete?

No

Yes

645 — Aggregate convolution output(s)

650 — Output aggregated convolution outputs

Receive an activation tensor

710

Select a first subset of weight elements, corresponding to a first set of non-zero elements in the activation tensor, from a weight tensor

715

Multiply the first set of non-zero elements and the first set of weight elements

DESPARSIFIED CONVOLUTION FOR SPARSE ACTIVATIONS

INTRODUCTION

Aspects of the present disclosure relate to efficient convolution operations.

Convolution has become an increasingly important operation for a wide variety of computational solutions, including in convolutional neural networks (which often involve applying a large number of convolution operations to input data). Convolutional neural networks can be trained for myriad tasks, such as computer vision (e.g., image or object recognition), audio processing, and the like. Generally, a single convolution operation involves multiplying one or more portions of an input tensor with one or more weights in a convolution kernel (e.g., where the weights are organized as a set of channels of K×K kernels), where the weights are learned during a training process. Conventional convolution operations and networks typically require a massive number of such multiplications owing to a number of factors, including the size of the data tensors (e.g., the number of elements), the number of applications of each kernel, the number of kernels, the number of layers, and the like.

Often, convolution operations are paired with activation operations. For example, the output of a given convolution is often processed using an activation function (e.g., ReLU) before being used as input to a subsequent convolution. Many popular activation functions introduce nonlinearity to the network by setting some subset of the elements in the input tensor to zero. For example, in the case of ReLU, all negative values are set to zero. These nonlinear functions are extensively used and can significantly improve the accuracy of the models. Notably, they also introduce a significant amount of sparsity to intermediate data (in the form of zero values) being processed by a neural network.

Conventional neural networks often ignore this sparsity, and, for example, convolve all elements of an input tensor, even though convolving an element with a value of zero has no effect on the output of the convolution. This wastes energy, time, and computational resources. Some conventional approaches to handle sparsity have focused on sparse weight tensors, which are known a priori (e.g., prior to runtime inferencing), and thus can be handled using static approaches. Activations, however, are unknown until runtime, and as such must be handled dynamically.

Conventional approaches to activation sparsity generally require modification of the network itself, re-training of the network, and/or additional rounds of training and data accesses, which result in significant additional costs in computation and development. Furthermore, such additional costs often come with inevitable degradation of model accuracy and performance.

Accordingly, techniques are needed for improved convolution of sparse tensors.

BRIEF SUMMARY

Certain aspects provide a method, comprising: receiving an activation tensor; and generating a first convolution output for the activation tensor, comprising: selecting a first subset of weight elements, corresponding to a first set of non-zero elements in the activation tensor, from a weight tensor; and multiplying the first set of non-zero elements and the first set of weight elements.

Other aspects provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

FIG. 4 depicts an example architecture to perform sparsity look-ahead using a set of shifters.

FIG. 6 depicts an example flow diagram illustrating a method for desparsified convolution.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure provide techniques for improved convolution, referred to herein as desparsified convolution.

In aspects, desparsified convolution utilizes sparsity look-ahead to recognize sparsity in activations in order to perform math equivalent convolution with reduced computational complexity. That is, rather than approximate a conventional convolution operation, the techniques described herein result in a mathematically equivalent output, allowing the desparsified convolution operation to be used to improve computational efficiency and latency without affecting model accuracy.

Moreover, the techniques described herein are light-weight, both in terms of design and computational complexity and execution overhead. Additionally, the desparsified convolution is readily applied in any model and location, including both during training and during inferencing, without requiring any network modifications or re-training. Further, the desparsified convolution operations can be used to replace a variety of convolution types, including standard convolution and pointwise convolution, as well as in fully connected layers.

In an aspect, the desparsified convolution operation enables dynamic identification of non-zero (or non-null) activation elements, dynamic retrieval of the corresponding weights for these non-zero activations, and computation using only these non-zero elements. By bypassing activation elements having a value of zero (and the corresponding weights), the techniques described herein are able to perform mathematically equivalent convolution using fewer computational resources (e.g., reduced memory usage, reduced processing time, reduced energy consumption, and the like), thereby significantly improving the operations of the models, as well as the underlying systems that train and use such models. As used herein, an element may be referred to as "sparse" to indicate that it has a value of zero, or a null value. Similarly, an element may be referred to as "non-sparse" to indicate that it has a non-zero value or a non-null value. In aspects, alternative implementations may include other definitions or formats, such as where elements with a value less than a defined value are considered sparse.

Example Workflow for Performing Desparsified Convolution

Figure 1:
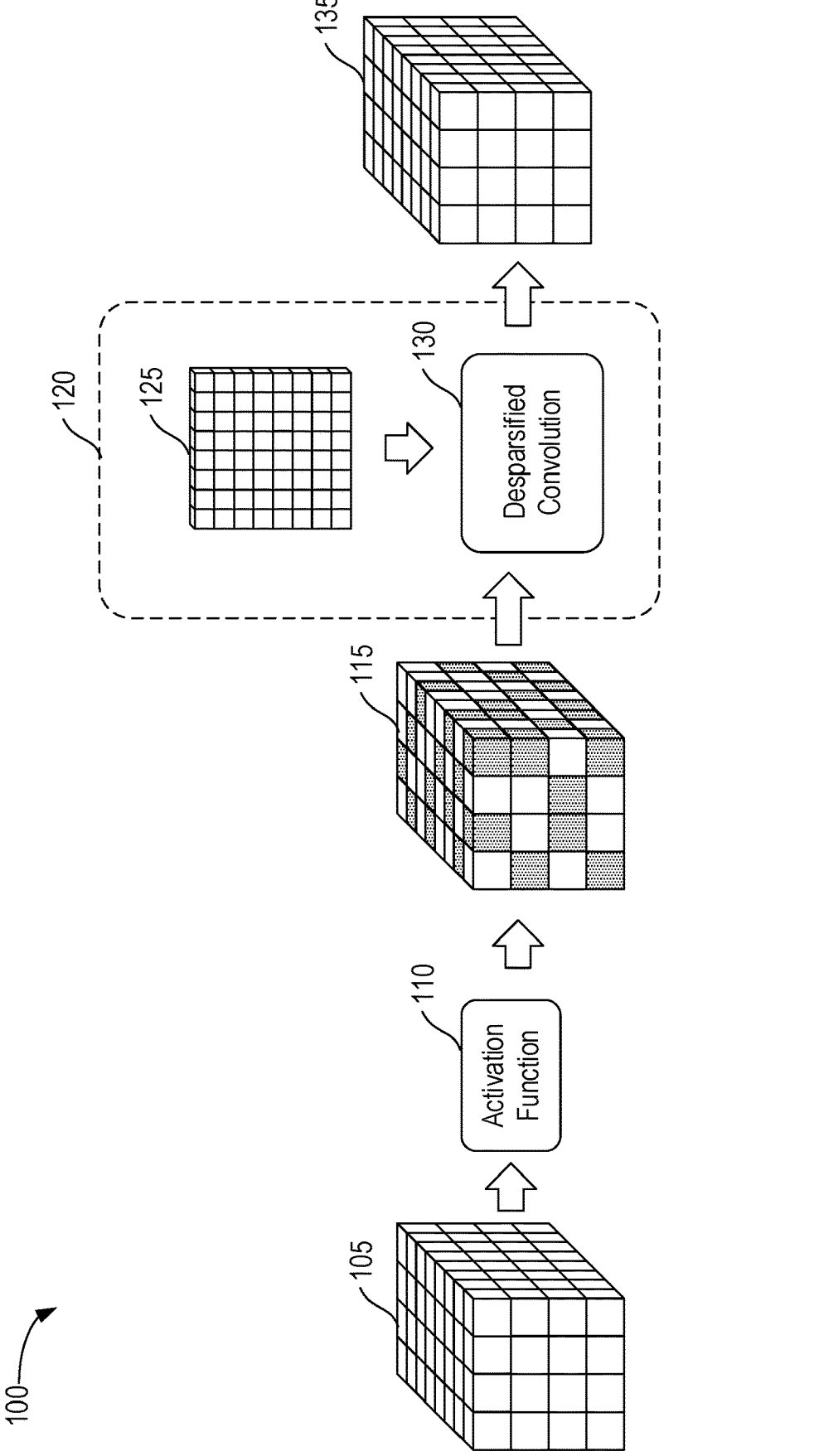
FIG. 1 depicts an example workflow for performing desparsified convolution.

FIG. 1 depicts an example workflow 100 for performing desparsified convolution for an example layer of a convolutional neural network.

In the illustrated workflow, an input tensor 105 is received for processing by the example layer. In an aspect, the input tensor 105 can generally correspond to a tensor having a number of data elements, each element corresponding to some numerical value. Generally, the input tensor 105 can have any dimensionality, including, for example, $H \times W \times C_{in}$, where H is the height of the input tensor 105 (e.g., the number of elements in the vertical orientation), W is the width of the tensor 105 (e.g., the number of elements in the horizontal orientation), and $C_{in}$ is the number of channels in the tensor 105 (e.g., the number of elements in the depth of the tensor). Generally, the height and width may be referred to as spatial dimensions, while the number of channels may be referred to as the depth dimension. In the illustrated example, the tensor 105 has dimensionality 4×4×8.

In one aspect, the tensor 105 may be referred to as pre-activation data, as it has not yet been processed using an activation function of the layer (such as activation function 110). For example, the tensor 105 may be the output of one or more prior layers (e.g., output of a convolution operation in a previous layer) of a neural network prior to activation, the original input to a neural network, and the like. In some aspects, the elements in the input tensor 105 can have a wide range of values. In some implementations, the input tensor 105 may be considered fairly dense, in that it will often have few (or no) elements with a value of zero.

In the illustrated aspect, the input tensor 105 is processed using an activation function 110 to generate an activation tensor 115 (also referred to in some aspects as activation data, a set of activations, or simply activations). The particular algorithm or operations of the activation function 110 may vary depending on the particular implementation. For example, the activation function 110 may be a ReLU activation function (e.g., a function that sets negative input elements to zero, and leaves positive input elements unchanged), a binary step function, a linear function, a sigmoid function, a hyperbolic tangent (tanh) function, a leaky or parametric ReLU function, a softmax function, a swish function, and the like.

In the illustrated workflow 100, the activation tensor 115 includes some amount of sparsity, indicated by the pattern of each element. Specifically, sparse elements (e.g., those with a value of zero) may be indicated by stippling, while non-sparse elements (e.g., those with a non-zero value) have no stippling. In aspects, the distribution of sparsity in the activation tensor 115 is generally not able to be determined a priori. That is, at least until the input tensor 105 is known, the particular sparse and non-sparse elements of the activation tensor 115 cannot be determined. As the input tensor 105 is, itself, unknown until runtime (e.g., until it is generated by a prior layer in the network), the system cannot use any static configuration to handle this activation sparsity (as contrasted with weights, which are generally fixed after training).

In conventional approaches, the system simply convolves this (potentially sparse) activation tensor 115 with a set of weights (e.g., in a weight tensor 125) for each convolution kernel that is to be used for the layer. This involves multiplication and aggregation of a (potentially large) number of sparse elements in the activation tensor 115, even though multiplication of these elements will inherently result in a value of zero, thereby having no impact on the convolution output. Thus, conventional systems waste significant computational resources and time by processing these sparse elements.

In some cases, sparsity can approach or exceed fifty percent of the activations. That is, half of the elements, or more, of the activation tensor 115 may be zero-valued. For example, ReLU sets all negative values to zero. As the values of the input tensor 105 are generally centered around zero (e.g., due to normalization processes within the network), roughly half of the elements in the tensor 105 may be set to zero. Thus, by using desparsified convolution operations described herein, the system can significantly reduce the computational expense of the convolution (on the order of 50%) for a wide variety of models.

In the illustrated workflow 100, rather than using a conventional convolution, the activation tensor 115 is processed by a convolution bypass 120 using a desparsified convolution block 130. Although illustrated as a discrete convolution bypass 120 for conceptual clarity, in aspects, the desparsified convolution block 130 can generally be used to replace any convolution operation. The convolution bypass 120, indicated by a dashed-line box, is depicted for ease of reference when describing the operations involved in performing the desparsified convolution block 130. Generally, the convolution bypass 120 involves processing some elements (e.g., non-sparse elements) in the activation tensor 115, while bypassing convolution of others (e.g., of sparse elements).

Generally, as discussed above, conventional convolution involves multiplying each element of the activation tensor 115 using one or more elements in a weight tensor 125 to yield an output tensor. In the illustrated example, the convolution bypass 120 instead uses the desparsified convolution block 130 to operate on only a subset of the activation tensor 115. Specifically, the convolution bypass 120 can dynamically identify sparse and/or non-sparse elements in the activation tensor 115. For each non-sparse element, the convolution bypass 120 may identify the corresponding weight(s) in the weight tensor 125, and generate the output tensor 135 using only these non-sparse elements and corresponding weights. In an aspect, as the convolution bypass 120 does not operate on the sparse elements (e.g., they are skipped or bypassed), the computational resources needed to generate the output tensor 135 are significantly reduced. One example of the desparsified convolution block 130 is described in more detail below with reference to FIG. 3.

Although aspects of the present disclosure refer to desparsified convolution of sparse input, it is to be understood that the desparsified convolution techniques can be readily used to convolve relatively non-sparse input tensors as well. That is, the desparsified convolution techniques described herein can be used to process input with any amount of sparsity, including high sparsity (e.g., with few non-sparse elements), low sparsity (e.g., with few sparse elements), and no sparsity (e.g., with no sparse elements). As the resulting output is mathematically equivalent to conventional convolution, use of desparsified convolution on dense input simply requires a conventional amount of computational resources (e.g., the same number of multiplications as conventional convolution).

In at least one aspect, the desparsified convolution block 130 is defined using equation 1 below, where $y=[y_{hw}: h \in \{0, \ldots, H-1\}, w \in \{0, \ldots, W-1\}]$ (e.g., where y is the output tensor 135 having dimensionality $H \times W \times C_{out}$), $W_{ij}$ is the weight tensor 125, $x_{hw}$ is the input tensor 105, σ represents application of the activation function 110 (thereby generating the activation tensor 115), and D(•) and $D_M(\bullet)$ are a desparsification-selection operation pair, where $D_M(\bullet)$ selects columns of an input matrix based on a mask reflecting indices of non-sparse entries of a tensor, as identified by D(•).

$$y = \Sigma_{i,j} D_M(W_{ij}) D(\sigma(x_{hw,ij})) \text{over}(h, w) \qquad (1)$$

As discussed above, by using desparsified convolution block 130, the convolution bypass 120 is able to perform convolution that is mathematically identical to conventional convolution, while using significantly reduced computational resources. This can reduce power demands, improve computational throughput, reduce memory and processing needs, and maintain accuracy of the underlying machine learning model(s). Additionally, as the desparsified convolution block 130 can be used whenever conventional convolution is used, the desparsified convolution block 130 can be used during training of machine learning models (e.g., during a forward pass of training data through the model), during inferencing after the model has been trained, and the like.

Figure 2:
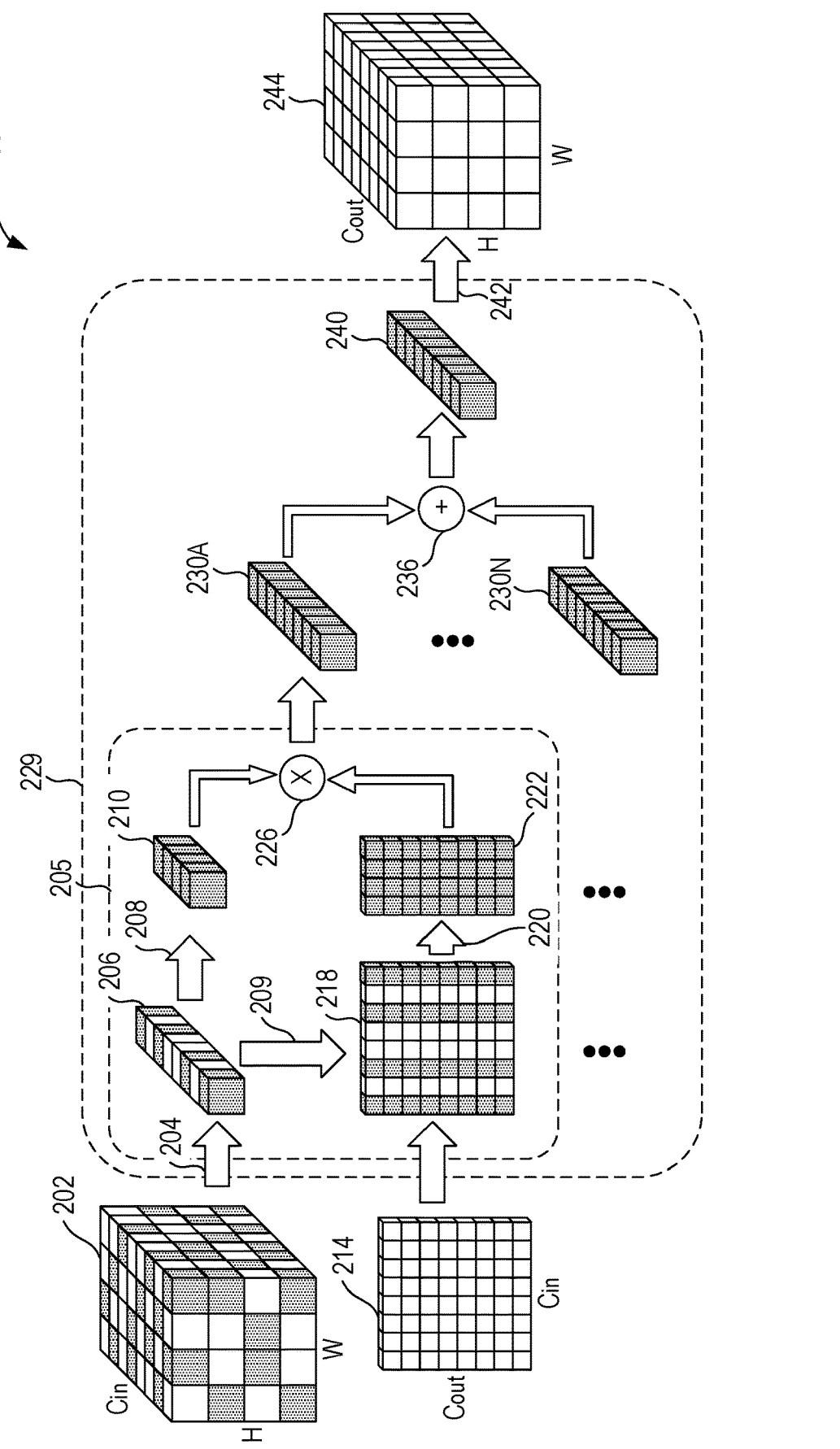
FIG. 2 depicts an example workflow efficiently generating convolution output using desparsified convolution on relatively sparse activation tensors.

Example Workflow for Generating Convolution Output Using Desparsified Convolution FIG. 2 depicts an example workflow 200 for generating convolution output using desparsified convolution on potentially sparse activation tensors. In at least one aspect, the workflow 200 is performed by a convolution system, such as convolution bypass 120 of FIG. 1. As discussed above, the workflow 200 can generally be used in place of any conventional convolution, including standard and pointwise, as well as to replace fully connected layers. Further, the workflow 200 can be used during training of a model, inferencing using the model, or both.

As illustrated, an input tensor 202 (also referred to as an activation tensor in some aspects) having dimensionality $H \times W \times C_{in}$ is received for convolution using a weight tensor 214 (also referred to as a weight matrix in some aspects) having dimensionality $C_{out} \times C_{in}$. In the illustrated example, the stippling is used to indicate non-sparse elements of data (e.g., non-zero values) in the input tensor 202, and white or blank elements indicate sparse values (e.g., zero values) in the input tensor 202. The weight tensor 214 does not include such stippling, as the workflow 200 involves identifying sparsity in the activations, not the weights. In the illustrated example, some stippling is used in the weight values (e.g., at 218 and 222) to indicate which weights are selected for convolution. It is to be understood that both the selected and non-selected weight values may or may not include sparsity (e.g., zero values) values, as the selection is driven based on sparsity in the input tensor 202.

The illustrated workflow 200 uses two loops, an inner loop 205 and an outer loop 229 indicated by dashed line rectangles, to generate an output tensor 244 having dimensionality $H \times W \times C_{out}$. Generally, the inner loop 205 corresponds to processing a single spatial element of the input tensor 202 (e.g., an (h, w) index in the spatial dimensions, across all channels in the input tensor 202). This inner loop 205 may be performed M*N times to apply a kernel of size M×N one time. That is, suppose the convolution kernel to be used to generate the output tensor 244 is a 3×3 kernel. In the illustrated workflow 200, the inner loop 205 will be repeated nine times, once for each spatial value/vector included in the receptive field of the kernel (e.g., once for each spatial element in the patch of the input tensor 202 that is being convolved with the kernel). That is, each iteration of the inner loop 205 may correspond to a multiplication between a single spatial element/vector in the input tensor 202 with a corresponding weight in the weight tensor 214. If the convolution is a pointwise convolution, then the inner loop 205 is performed only once (as there is only one spatial element in the receptive field of the kernel). Generally, the kernel (also referred to as a filter in some aspects) corresponds to all or a portion of the weight tensor 214 (e.g., the weight tensor 214 stores weights for one or more kernels). By repeating the inner loop 205 (where, for each iteration a respective element in the patch of the input tensor 202 is multiplied with a corresponding element in the weight tensor), the system can generate the output for a single application of the kernel at a single position (e.g., without striding).

Additionally, in the illustrated workflow 200, each iteration of the outer loop 229 corresponds to a respective application of the kernel (e.g., for a given receptive field). That is, a first iteration corresponds to application of the kernel at a first position (covering a first receptive field), while a second iteration can correspond to application of the kernel at a second position (e.g., covering a second receptive field, after striding the kernel). In an aspect, the outer loop 229 can be performed J times, where J is the number of times the kernel is applied during convolution. In aspects, this value may vary depending on the size of the input tensor 202 and output tensor 244, the stride of the convolution, whether padding is used, and the like. For example, for a pointwise convolution (e.g., using a 1×1 kernel) using a stride of one, the outer loop 229 may be repeated for H*W iterations, where H and W are the height and width of the input tensor 202, respectively.

In the illustrated workflow 200, for each iteration of the inner loop 205, the input tensor 202 undergoes a slicing operation 204 to yield a vector 206. Although the illustrated example depicts a slicing "operation" 204, in some aspects, the system does not use a discrete operation, but instead simply accesses or processes the input tensor 202 in slices (e.g., where the vector 206 is a slice of the input tensor 202). The vector 206 generally corresponds to a single spatial element (e.g., a single index in the spatial dimensionality of the input tensor 202) across all channels of the input tensor 202. For example, for one iteration of the inner loop 205, the vector 206 may correspond to the bottom-left element (across all channels) of the input tensor 202. For a subsequent iteration, the vector 206 may be the bottom-right element across all channels (with any number of iterations occurring in between).

As illustrated by operation 208, the convolution system applies a sparsity look-ahead operation to identify sparse and/or non-sparse elements in the vector 206. Generally, the operation 208 can be performed using any suitable technique, including via one or more shifters or switches (discussed in more detail below with reference to FIG. 4), using in-place operations (e.g., bypassing sparse elements and directly applying non-sparse elements to the convolution hardware, such as a multiply-and-accumulate circuit), using a first-in first-out (FIFO) circuit (e.g., bypassing sparse elements and inserting non-sparse elements into the FIFO), and the like.

The sparsity look-ahead operation 208 results in a reduced vector 210 corresponding to non-sparse elements from the vector 206. As discussed above, the convolution system can efficiently perform the convolution by operating on only these non-sparse elements, bypassing processing of the sparse elements. As illustrated by the operation 209, the sparsity look-ahead operation 208 is also used to indicate the corresponding set of relevant weights for the non-sparse elements. In the illustrated example, the weight tensor 218 includes stippling to indicate these relevant weights.

In aspects, the convolution system can use any suitable technique to indicate the relevant weights. In one aspect, the operation 209 indicates a set of offsets or indices for the non-sparse elements in the vector 206. For example, the sparsity look-ahead operation 208 may generate a set of offsets indicating that the non-sparse elements are located at indices [0, 2, 5, and 7] (indicated by stippling) in the vector 206 (and/or that the corresponding weights are at these indices). In some aspects, the operation 209 includes a set of address offsets which the convolution system uses to retrieve the relevant weights from memory (e.g., from a tightly coupled memory (TCM) having a dedicated connection to the processing core(s) of the system that are used to generate the convolution output).

As illustrated by operation 220, using these offsets or indices, the convolution system extracts the relevant set of weights 222 from the weight tensor 218. In aspects, the relevant set of weights 222 can be extracted using in-place operations (e.g., directly retrieving the relevant weights and applying them to the convolution hardware, such as a multiply-and-accumulate circuit), using a first-in first-out (FIFO) circuit (e.g., inserting the relevant weights into the FIFO and bypassing the other weights), and the like. At block 226, the set of non-sparse activations (in the vector 210) and the relevant set of weights 222 are then multiplied to generate an intermediate tensor 230A. For example, the block 226 may include performing element-wise multiplication of the vector 210 and weights 222, followed by corresponding accumulations (as part of typical convolution operations). As discussed above, the inner loop 205 corresponds to processing of a single spatial element in the input tensor 202. Each iteration of the inner loop 205 results in a corresponding intermediate tensor 230. As indicated by the ellipses, the inner loop 205 is repeated until each element in the kernel has been applied to a corresponding element in the input tensor 202 (e.g., nine times for a 3×3 kernel), resulting in a set of intermediate tensors 230 (e.g., nine intermediate tensors 230 for a 3×3 kernel).

In the workflow 200, at block 236, these intermediate tensors 230A-N are then aggregated (e.g., using element-wise summation) to generate a convolution output 240.

Though not depicted in the illustrated example for conceptual clarity, in some aspects, prior to this summation, the convolution system expands the intermediate tensors 230 back to the proper depth (e.g., based on the indices or offsets determined in operations 208 and/or 209). That is, as part of the aggregation (or as part of or after the multiplication operation at block 226), the convolution system can generally expand the vectors (by inserting zeros in appropriate locations, indicated via the offsets or indices) as needed, such that the intermediate tensors 230 have the appropriate depth $C_{out}$ for the output tensor 244.

Generally, the convolution output 240 corresponds to a single application of a convolution kernel. That is, the convolution output 240 is generated by convolving a convolution kernel with the input tensor 202 at a single position. Convolution often involves striding the convolution kernel across the input tensor 202, generating a corresponding convolution output for each position of the kernel. In the illustrated example, therefore, the outer loop 229 is repeated for each such kernel position, resulting in a set of convolution outputs 240. For example, if the convolution is a pointwise operation using a stride of one, then the outer loop 229 is repeated H*W times, resulting in an equal number of convolution outputs 240. Generally, the number of times the outer loop 229 is repeated is a function of the spatial dimensionality of the input tensor 202, the dimensionality of the kernel, the stride of the convolution operation, and the padding used (if any) during convolution.

More generally, the system can compute J convolution outputs 240, where J is the number of times the kernel is applied to the input tensor 202 during convolution, or the number of (h, w) positions on which the kernel is applied. Typically, for an H×W kernel, J=H*W (assuming a stride of one, and appropriate zero-padding).

Generally, the number of operations needed to perform a given desparsified convolution operation can vary depending on the particular type of convolution. For example, for a standard convolution using a stride of one, an input tensor H×W×$C_{in}$, an output tensor H×W×$C_{out}$, and a kernel of size M×N×$C_{in}$. (which may be decomposed into M*N pointwise convolutions before summing), the workflow 200 may use M*N iterations of the inner loop 205 and H*W iterations of the outer loop 229.

For a pointwise convolution using a stride of one, an input tensor H×W×$C_{in}$, an output tensor H×W×$C_{out}$, and a kernel of size 1×1×$C_{in}$, the workflow 200 may use one iteration of the inner loop 205 and H*W iterations of the outer loop 229.

For a fully connected operation, the input dimensionality can be cast as 1×1×$C_{in}$, and the output data can be cast as 1×1×$C_{out}$. A kernel of size 1×1×$C_{in}$ can be used to replicate this operation (e.g., with a value of one). In such an aspect, the workflow 200 may use 1 iteration of the inner loop 205 and 1 iteration of the outer loop 229.

In the depicted workflow 200, the convolution outputs 240 are then combined using a stacking operation 242 (or other operation) to generate a final output tensor 244 from the convolution operation. That is, the final output tensor 244 is generally created by aggregating (such as by stacking) the convolution outputs 240. Stated differently, the values of the output tensor 244 are generated in a plurality of sets or segments, as reflected by the convolution outputs 240. As discussed above, the output tensor 244 is mathematically equivalent to an output generated using conventional convolution. However, as the desparsified convolution operates only on a subset of the input activations, it can be performed with significantly reduced computational cost and time.

Example Workflow for Pipelining Desparsified Convolution

Figure 3:
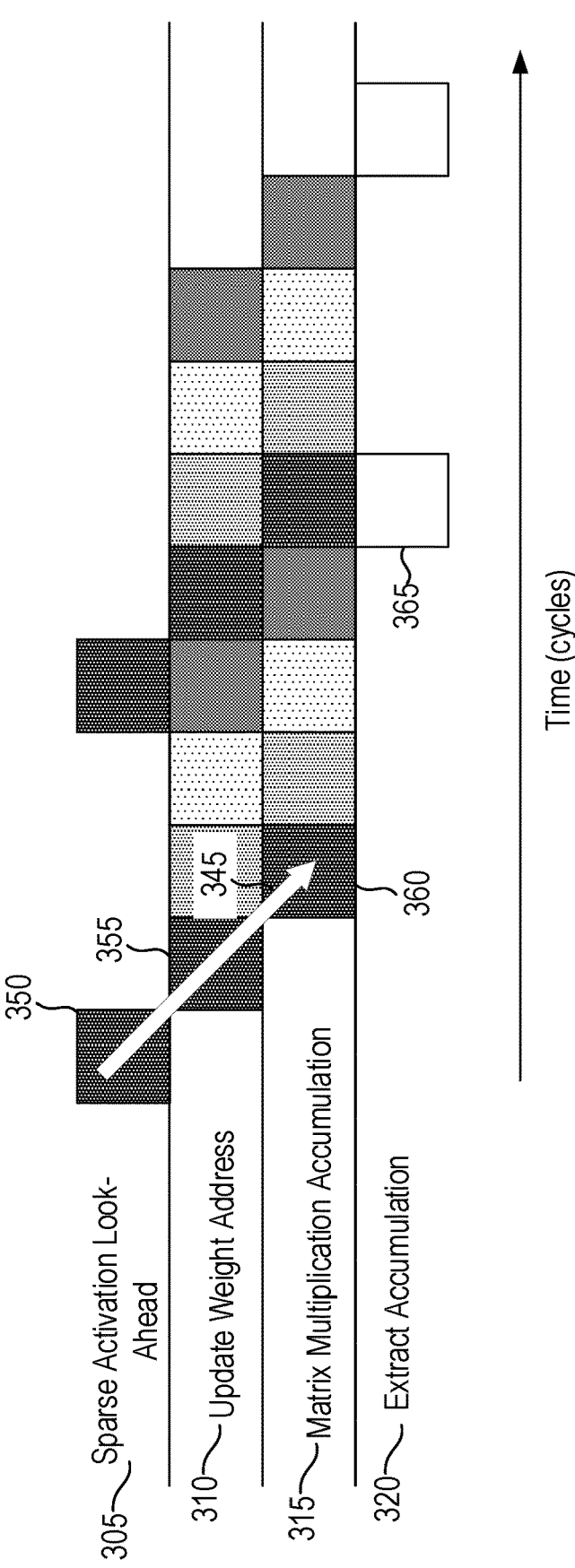
FIG. 3 depicts an example workflow for pipelining desparsified convolution to improve computational efficiency.

FIG. 3 depicts an example workflow 300 for pipelining desparsified convolution to further improve computational efficiency. In at least one aspect, the workflow 300 is performed by a convolution system, such as by using convolution bypass 120 of FIG. 1.

The illustrated example depicts a set of operations needed to perform desparsified convolution, where each block corresponds to a single operation at a single point in time (e.g., during a single clock cycle), and various densities of stippling are used to indicate which blocks are linked via data dependencies. In the illustrated workflow 300, the arrow 345 indicates the flow of data, for one convolution cycle (e.g., for one iteration of the inner loop 205), through the pipeline.

For example, at block 350, the convolution system can first use an operation 305 (labeled "Sparse Activation Look-Ahead") to perform sparsity look-ahead in the activation data. In one aspect, this operation 305 corresponds to the operation 208 of FIG. 2.

In the next clock cycle, at block 355, this sparsity information (e.g., the set of indices or offsets) are used to perform an operation 310 (labeled "Update Weight Address") to update the weight address(es) to point to the relevant set of weights that correspond to the non-sparse activations. In some aspects, the convolution system can extract and/or process multiple such weights in parallel (e.g., using single instruction, multiple data (SIMD) instructions). In one aspect, the operation 310 corresponds to operation 209 of FIG. 2.

In a subsequent clock cycle, at block 360, these weights, as well as the non-sparse activations, can be processed using operation 315 (labeled "Matrix Multiplication Accumulation"), where the non-sparse activations and corresponding weights are multiplied, as discussed above. In one aspect, this operation 315 corresponds to block 226 and/or block 236 of FIG. 2. In the illustrated example, operations 310 and 315 may be repeated one or more times to sweep across all of the non-sparse elements in the activation tensor (or the relevant portion of the activation tensor, such as the portion extracted by the slicing operation discussed above). At block 365, the convolution system applies a final operation 320 (labeled "Extract Accumulation"), where the accumulated products are extracted from the accumulator to one or more registers. In many cases, the accumulator has a wider bit-width than the operands of the multiplications (e.g., 40 bits) than ordinary registers (which may be, for example eight or sixteen bits wide). In one aspect, the operation 320 corresponds to stacking operation 242 of FIG. 2. That is, block 365 may represent an iteration of the outer loop 229 of FIG. 2.

As illustrated, the operations can be pipelined effectively to allow the convolution system to efficiently perform desparsified convolution.

Example Architecture for Sparsity Look-Ahead

FIG. 4 depicts an example architecture 400 to perform sparsity look-ahead using a set of shifters. The architecture 400 depicts a desparsification switch comprising a set of parallel shifters.

In the illustrated aspect, a set of activations 405 are used as input to the desparsification switch via blocks 410A-H. Specifically, input block 410A receives a first activation (labeled "A"), input block 410B receives a second activation (labeled "B"), and so on. As discussed above, the activations 405 generally correspond to all or a portion of an activation tensor. For example, the activations 405 may correspond to a portion of the activation tensor 115 of FIG. 1, and/or to the vector 206 in FIG. 2. In the illustrated example, non-sparse activations 405 (e.g., activations with a non-zero value) are indicated using stippling, while sparse activations (e.g., those with a value of zero) are not stippled. As discussed above, the sparsity of the activations 405 is not known a priori, and must be determined dynamically.

Although the illustrated example includes eight input blocks 410, there may be any number of input blocks in various aspects, depending on the particular implementation and architecture. As illustrated, the desparsification switch also includes a set of shifters 420A-D. In some aspects, these shifters 420 may correspond to hardware components (e.g., shift registers), software components, or a combination of hardware and software. Though four shifters are included for illustration, there may be any number of shifters depending on the particular implementation and architecture. Generally, changing the number of input blocks 410 and/or shifters 420 can affect the amount of sparsity that is handled by the system per cycle. For example, additional input blocks 410 can allow the system to desparsify more of the activation tensor at once. Additional shifters 420 can allow the system to more-readily handle more dense (e.g., less-sparse) activations.

In some aspects, the number of shifters 420 is selected to be half the number of input blocks 410. This can allow the system to efficiently handle sparsity of up to fifty percent (e.g., where approximately half of the values are zero), which enables efficient convolution with minimal additional switching components. As discussed above, many common activation functions, such as ReLU, result in approximately 50% sparsity. Thus, by using a 2:1 ratio of input blocks 410 to shifters 420, the desparsification switch is able to efficiently extract the non-sparse elements. Though additional shifters 420 may enable more efficient handling of higher-density inputs, it also involves additional costs (e.g., through the need for additional hardware, higher chip area, increased power requirements, and the like). In aspects, the specific number and ratio of shifters 420 and input blocks 410 may vary depending on the particular implementation and architecture.

In the illustrated architecture 400, there are a set of connections 415 or links from the input blocks 410 to the shifters 420. Specifically, each input block 410 can provide input to one or more shifters 420, and each shifter 420 can receive input from multiple input blocks 410. In the depicted example, each shifter 420 covers a look-ahead span of four. That is, each shifter 420 is linked to a respective set of four input blocks 410, and can receive activations 405 from this range of four input blocks 410. Specifically, the first shifter 420A is linked to input blocks 410A, 410B, 410C, and 410D. The second shifter 420B is linked to input blocks 410B, 410C, 410D, and 410E. As indicated by the ellipses, the remaining connections 415 (to shifters 420C and 420D) are omitted for illustrative clarity. The shifter 420C is linked to input blocks 410C, 410D, 410E, and 410F, In some aspects, the shifter 420D is linked to input blocks 410E, 410F, 410G, and 410H. In some aspects, the final shifter (420D) may have a larger look-ahead span (e.g., a span of five). For example, the shifter 420D may be connected to input blocks 410D, 410E, 410F, 410G, and 410H. In aspects, the look-ahead span is a design choice that may differ depending on the underlying architecture, desired sparsity support, and the like.

Generally, each shifter 420 is configured to extract or select the left-most (e.g., with the lowest index) non-sparse activation 405 from among its set of inputs, and passes the index of the selected non-sparse element to its neighbor. For example, the shifter 420A selects the lowest-index non-sparse activation from the input blocks 410A-D, and passes this index (or the index plus one) to the shifter 420B. In an aspect, the shifter 420B then selects the lowest-index non-sparse activation with an index that is greater than the index used by the shifter 420A.

In the illustrated example, the shifter 420A selects activation "A" from input block 410A, and passes this information to the shifter 420B. Depending on the particular implementation, the shifter 420A may pass an indication that it selected an activation from input block 410A (e.g., passing index 0), and/or that the shifter 420B should begin searching at the input block 410B (e.g., passing index 1). The shifter 420B will then select activation "C" from input block 410C. As illustrated, using this approach, shifter 420C selects activation "F" from input block 410F, and shifter 420D selects activation "H" from input block 410H.

As illustrated, these selected (non-sparse) activations can then be provided to a downstream component for processing, such as into slots 430A-D (e.g., to form the vector 210 of FIG. 2). For example, the shifters 420 may input the selected activations into a FIFO, or may provide them directly as input to one or more components that perform the convolution (e.g., a MAC circuit). As discussed above, these indices or offsets can also be used to extract the relevant set of weights. Further, in some aspects, the indices or offsets can be used to expand the intermediate tensors as needed.

In aspects, the desparsification switch can efficiently handle both dense and sparse activations. In the case of particularly dense activations (e.g., where there are more non-sparse activations than shifters 420), the system may simply begin the next iteration or cycle at the relevant activation. For example, if activations "A", "B," "C", and "D" are all non-zero, then the system may initiate the subsequent iteration by providing the next activation ("E") to input block 410A. In one aspect if such dense activations are expected, then the system may include additional shifters 420.

Figure 5:
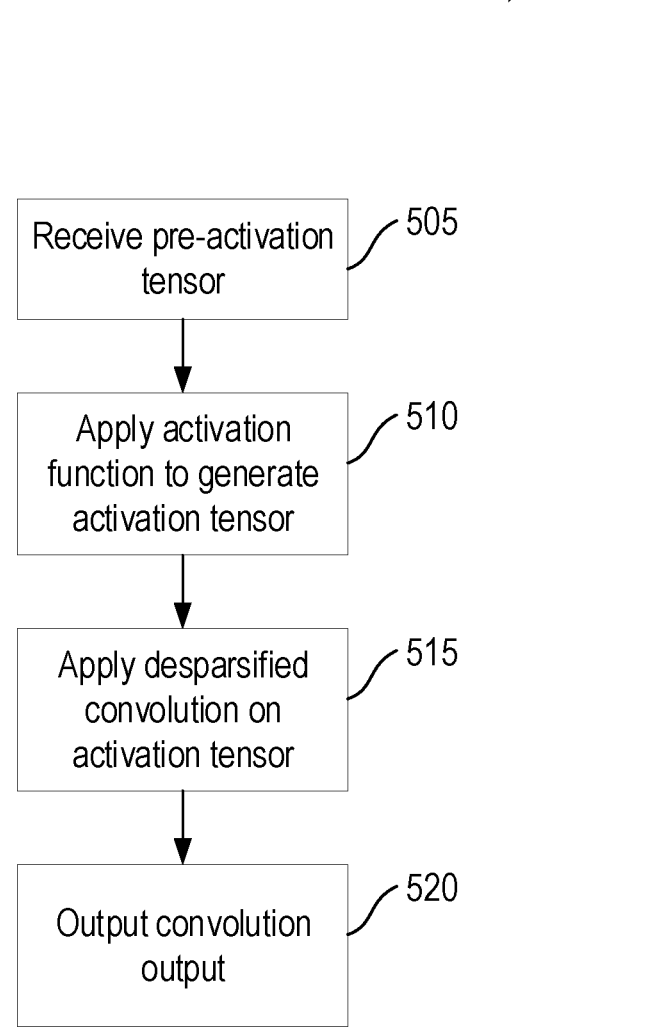
FIG. 5 depicts an example flow diagram illustrating a method for generating output using desparsified convolution.

Similarly, in the case of particularly sparse activations (e.g., where there are fewer non-zero activations than shifters 420), the shifters can simply select a zero-value activation if no non-sparse activations are available within the corresponding input range. For example, suppose activations "B", "C", "D", and "E" are all zero. In an aspect, the shifter 420B may select any of these zero-values, including selecting the left-most value as a default (e.g., selecting activation "B" from input block 410B), or selecting the right-most value as a default (e.g., selecting activation "E" from input block 410E). The shifter 420B can then indicate that the shifter 420C should begin at input block 410F. Though this may introduce some computational inefficiency (by processing a sparse element), the desparsified convolution can nevertheless proceed as normal. In some aspects, increasing the look-ahead span of the shifters can reduce this inefficiency with particularly sparse activations Example Method for Generating Output Using Desparsified Convolution FIG. 5 depicts an example flow diagram illustrating a method 500 for generating output using desparsified convolution. In at least one aspect, the method 500 is performed by a convolution system, such as by using convolution bypass 120 of FIG. 1. In one aspect, the method 500 provides additional detail for the workflow 100 of FIG. 1.

At block 505, the convolution system receives pre-activation data in the form of a pre-activation tensor. In an aspect, this data is referred to as "pre-activation" to indicate that it will be processed using one or more activation functions prior to convolution before convolution in a given layer (but potentially after convolution in a prior layer). For example, the pre-activation data may be output by a layer of a neural network (e.g., a convolution layer), where the model is configured to apply an activation function and then supply the result to a subsequent layer. Although the method 500 refers to pre-activation data as an example, in some aspects, the input data may simply be input data, regardless of whether an activation function is to be applied. For example, the method 500 (or a subset thereof) may be performed in the first layer of a neural network, allowing desparsified convolution to be applied to data that is input to the model.

At block 510, the convolution system applies an activation function to the input data in order to generate an activation tensor (e.g., a tensor of activation data). For example, the data may be processed using a ReLU activation function to introduce nonlinearity to the machine learning model. As discussed above, such activation functions can significantly improve the accuracy of the model for a variety of tasks. However, such activation functions often introduce at least some level of sparsity (by setting at least some non-zero values to zero). Generally, though these sparse elements have no effect on the output of each convolution operation (as multiplying by zero results in an output of zero), conventional systems still perform this (pointless) multiplication, thereby incurring significant computational expense to perform irrelevant computations.

At block 515, rather than perform such conventional convolution, the convolution system applies a desparsified convolution operation to the activation tensor. For example, one example technique for such desparsified convolution is discussed above with reference to FIG. 2. Generally, the desparsified convolution involves generating convolution output based on the non-sparse activations, while bypassing multiplication or convolution of one or more sparse activations in the tensor.

At block 520, the convolution system outputs the convolution output. In aspects, outputting the convolution output can include providing it as input to an activation function, providing it as input to a subsequent layer of a neural network, and the like.

As discussed above, this desparsified convolution can significantly improve computational efficiency by reducing the number of operations needed to perform the convolution, reducing the needed memory footprint, reducing energy expended, reducing computing time required, and the like.

Moreover, because the desparsified convolution techniques described herein are mathematically equivalent to conventional convolution (in that the generated output is identical to the output of conventional convolution), the convolution system is able to use this desparsified convolution at any stage where normal convolution could be applied, including in ordinary (full) convolution, in pointwise convolution, in depthwise-separable convolutions, in fully connected layers, and the like. Further, the desparsified convolution techniques are readily applicable both during training (e.g., during the forward pass of training data through the model) as well as during inferencing (e.g., while processing new data to generate output), and have no detrimental impact on the accuracy of the models.

Note that FIG. 5 is just one example of a method, and other methods including fewer, additional, or alternative steps are possible consistent with this disclosure.

Example Method for Desparsified Convolution

FIG. 6 depicts an example flow diagram illustrating a method 600 for desparsified convolution. In at least one aspect, the method 600 is performed by a convolution system, such as by using convolution bypass 120 of FIG. 1. In one aspect, the method 600 provides additional detail for the workflow 200 of FIG. 2.

At block 605, the convolution system selects a first kernel position for performing the convolution. As discussed above, convolution often involves applying a convolution kernel (e.g., a tensor specifying a set of weights) to an input tensor (e.g., an activation tensor generated by using an activation function) at multiple positions to generate corresponding outputs. The use of multiple kernel positions has conventionally been referred to as "striding" the kernel across the input, and the kernel stride is generally a configurable hyperparameter of the convolution.

In the illustrated example, at block 605, the convolution system selects one such position to generate a corresponding output. Generally, the particular methodology used to select this position can vary, as the convolution system will process each such position during the convolution operation. Additionally, though the illustrated example depicts an iterative process for conceptual clarity (e.g., processing each kernel position sequentially), some or all of these kernel positions may in fact be processed in parallel, in some aspects.

At block 610, convolution system extracts or otherwise accesses a slice from the input tensor. For example, as discussed above, the convolution system may use a slicing operation (e.g., slicing operation 204 of FIG. 2) to extract a vector (e.g., vector 206 of FIG. 2) having a height and width of one, with a depth equal to the number of input channels. That is, the convolution system may extract or otherwise access a set of elements corresponding values for each channel at a single index in the height and width dimensionality.

In one aspect, the slice is extracted from within the current range of the kernel (determined based on the kernel size and the position determined at block 605). In aspects, the particular methodology used to select/extract the slice from within this range may vary, as the convolution system will generally iterate through all relevant slices (e.g., all input slices that are involved in the convolution) during the method 600. Although a sequential process is depicted for conceptual clarity, in some aspects, all or a portion of the slices can be extracted and processed in parallel.

At block 615, the convolution system identifies a set of non-zero elements in the extracted slice. For example, as discussed above with respect to FIG. 4, the convolution system may use a desparsification switch to efficiently identify and extract the non-sparse elements, thereby bypassing any sparse (e.g., zero-value) elements. In some aspects, the convolution system can extract these elements and directly apply them as input to a downstream component (e.g., to a MAC array, and/or to block 226 of FIG. 2). In some aspects, the convolution system inputs the elements into a FIFO or queue.

Additionally, in at least one aspect, the convolution system also determines or extracts data used to identify the location(s) of these non-sparse elements. For example, the convolution system may determine their indices in the slice (e.g., which channel they belong to), and the like.

At block 620, the convolution system identifies the corresponding weight elements for the non-sparse elements. In one aspect, as discussed above, the convolution system does so using the indices or address offsets determined at block 615. For example, if the non-sparse activation elements are in the first and fourth positions of the slice, then the convolution system may determine that the corresponding weights are located at some base address (e.g., the start of the weight tensor) plus zero (for the first element), and plus three (e.g., plus three bytes, words, or other amount depending on the particular implementation) for the fourth element.

In some aspects, the convolution system can identify and extract these weight elements, inputting them directly to a downstream component (such as a MAC array). In some aspects, as discussed above, the convolution system may write the relevant weights to a FIFO or queue, as discussed above. They can then be input to the downstream processing component(s).

At block 625, the convolution system generates an intermediate tensor for the slice based on the non-sparse activation elements and the corresponding weights. For example, using a component such as block 226 in FIG. 2, the convolution system may multiply the activation and weight elements (e.g., using convolution, element-wise multiplication, and the like) to generate an intermediate tensor 230.

In some aspects, generating the intermediate tensor further includes expanding the resulting output tensor back to the original depth, as discussed above. For example, using the aforementioned indices or offsets, the convolution system can insert elements with a value of "zero" as needed (e.g., wherever a zero-element was skipped in the slice) to ensure that the non-sparse elements are located in the correct position(s) in the intermediate tensor.

At block 630, the convolution system determines whether there is at least one additional slice remaining for processing in the current range covered by the kernel. For example, if the kernel is a pointwise kernel, then the convolution system can determine that no further slices are needed, as the kernel covers only a single (spatial) element at a time. If the kernel is for standard convolution (e.g., a 3×3 kernel), then the convolution system can determine whether each of the (nine) relevant spatial elements have been processed. If at least one such slice remains, then the method 600 returns to block 610, as discussed above with reference to FIG. 2 and the inner loop 205.

If all such slices have been processed, the method 600 continues to block 635. At block 635, the convolution system aggregates the set of intermediate tensors (generated, for each slice, using blocks 615-625) to generate a convolution output tensor. For example, as discussed above with reference to FIG. 2, the convolution system may use element-wise summation to aggregate the intermediate tensors, resulting in a single tensor (e.g., convolution output 240) corresponding to a single application of the kernel.

The method 600 then proceeds to block 640, where the convolution system determines whether convolution is complete. For example, as discussed above, the convolution may include multiple applications of the kernel (e.g., including striding the kernel across the input tensor). If convolution is not complete (e.g., because there is at least one additional kernel position that must be used to compute the output of the convolution), then the method 600 returns to block 605 to select the next kernel position, as discussed above with reference to FIG. 2 and the outer loop 229. Although depicted for conceptual clarity as a sequential process, in some aspects, the convolution system can generate multiple convolution outputs (corresponding to multiple kernel positions) at least partially in parallel.

If the convolution has finished (e.g., if all kernel positions have been processed), then the method 600 continues to block 645, where the convolution system aggregates the convolution outputs. For example, as discussed above, the convolution system may stack the convolution outputs based on the kernel position used to generate each one (e.g., placing the convolution output generated by applying the kernels in the leftmost and topmost position in the top-left corner of the resulting stack). In this way, as discussed above, the convolution system is able to perform convolution that is mathematically equivalent to conventional convolution while using a reduced number of operations and thereby incurring reduced computational expense.

At block 650, the convolution system outputs the aggregated (e.g., stacked) convolution outputs as the overall output tensor of the convolution process. In aspects, as discussed above, this output can be used for a variety of purposes, including as input to a subsequent layer of a neural network, as input to an activation function, as an output from the last layer of a neural network, and the like. Additionally, as discussed above, this desparsified convolution process can generally be applied for a wide variety of use cases, including both pointwise and full convolution, as well as during both training and inferencing.

Note that FIG. 6 is just one example of a method, and other methods including fewer, additional, or alternative steps are possible consistent with this disclosure.

Example Method for Generating Convolution Output Using Desparsified Convolution

Figure 7:
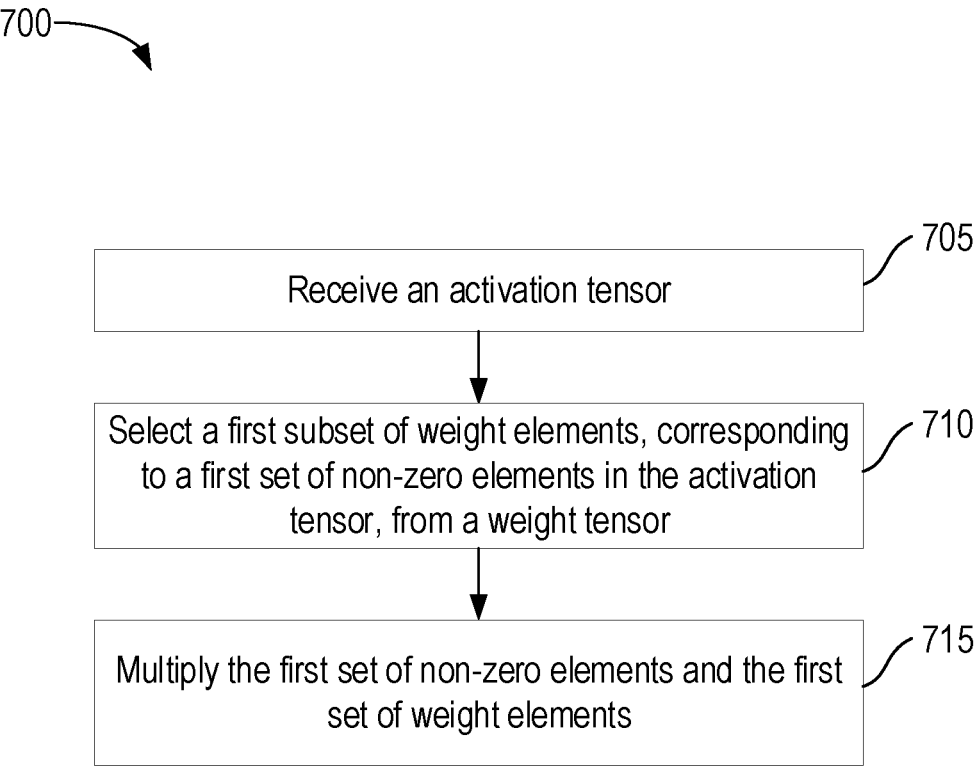
FIG. 7 depicts an example flow diagram illustrating a method for generating convolution output using desparsified convolution.

FIG. 7 depicts an example flow diagram illustrating a method 700 for generating convolution output using desparsified convolution. In at least one aspect, the method 700 is performed by a convolution system, such as by using convolution bypass 120 of FIG. 1.

At block 705, an activation tensor is received.

At block 710, a first subset of weight elements, corresponding to a first set of non-zero elements in the activation tensor, is selected from a weight tensor. In some aspects, the first subset of weight elements is a proper subset of the weight tensor (e.g., the first subset of weight elements excludes at least one element of the weight tensor).

At block 715, the first set of non-zero elements and the first set of weight elements are multiplied.

In some aspects, blocks 710, and 715 correspond to generating a first convolution output for the activation tensor.

In some aspects, the method 700 further includes identifying a set of respective indices, wherein each respective index of the set of respective indices corresponds to a respective non-zero element of the first set of non-zero elements.

In some aspects, retrieving the first set of weight elements based on the set of respective indices comprises: determining a set of memory offsets based on the set of respective indices, and retrieving the first set of weight elements from a memory using the set of memory offsets.

In some aspects, the memory is a tightly coupled memory (TCM) having a dedicated connection to a processing core used to generate the first convolution output.

In some aspects, the first set of non-zero elements is identified within a first one-dimensional vector extracted from the activation tensor, and the first one-dimensional vector corresponds to a single spatial element across input channels in the activation tensor.

In some aspects, the first convolution output corresponds to a first application of a kernel having a height of M and a width of N, and generating the first convolution output comprises: identifying M*N sets of non-zero elements in the activation tensor; selecting M*N sets of weight elements corresponding to the M*N sets of non-zero elements; and generating a set of intermediate tensors by multiplying each of the M*N sets of weight elements with a corresponding set of non-zero elements from the M*N sets of non-zero elements.

In some aspects, generating the first convolution output further comprises summing the set of intermediate tensors to yield the first convolution output.

In some aspects, the method 700 further includes generating a second convolution output corresponding to a second application of the kernel, and generating an overall convolution output for the activation tensor by stacking the first and second convolution outputs.

In some aspects, H*W convolution outputs are generated for the activation tensor, H is a height of the activation tensor, and W is a width of the activation tensor.

In some aspects, the first convolution output is generated as part of applying a convolution kernel comprising at least one of: a width dimension greater than one, or a height dimension greater than one.

In some aspects, the first convolution output is generated as part of applying a convolution kernel comprising: a width dimension equal to one, and a height dimension equal to one.

In some aspects, the first convolution output is generated as part of a training process for a neural network.

In some aspects, the first convolution output is generated as part of generating an inference using a trained neural network.

Note that FIG. 7 is just one example of a method, and other methods including fewer, additional, or alternative steps are possible consistent with this disclosure.

Example Processing System for Desparsified Convolution

Figure 8:
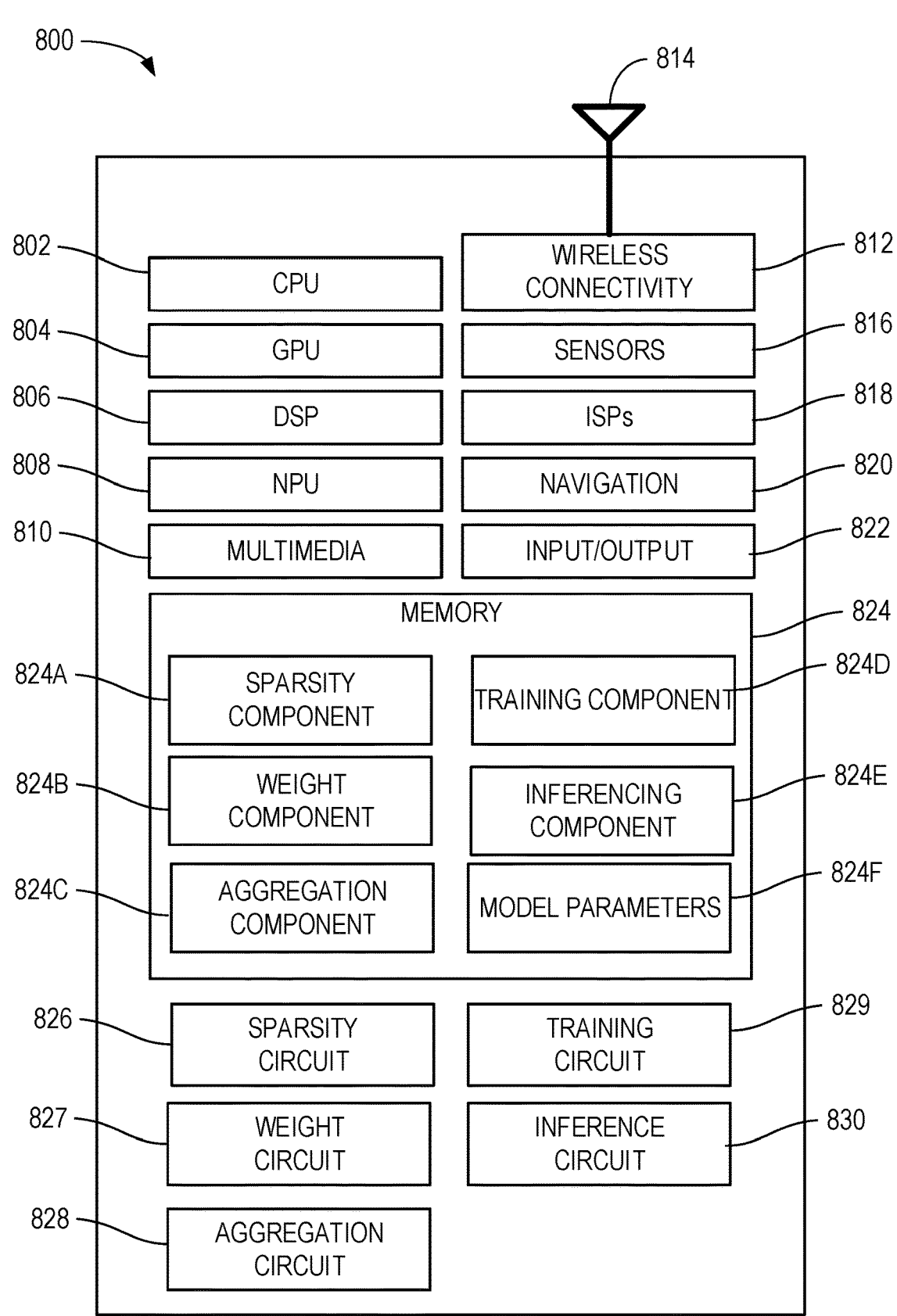
FIG. 8 depicts an example processing system configured to perform various aspects of the present disclosure.

In some aspects, the workflows, techniques, and methods described with reference to FIGS. 1-7 may be implemented on one or more devices or systems. FIG. 8 depicts an example processing system 800 configured to perform various aspects of the present disclosure, including, for example, the techniques and methods described with respect to FIGS. 1-9. In one aspect, the processing system 800 may correspond to a convolution system that uses the convolution bypass 120 of FIG. 1, as discussed above. In at least some aspects, as discussed above, the operations described below with respect to the processing system 800 may be distributed across any number of devices. For example, one system may train models using desparsified convolution, while a second uses the trained models to inference using desparsified convolution.

Processing system 800 includes a central processing unit (CPU) 802, which in some examples may be a multi-core CPU. Instructions executed at the CPU 802 may be loaded, for example, from a program memory associated with the CPU 802 or may be loaded from a memory partition (e.g., from the memory 824).

Processing system 800 also includes additional processing components tailored to specific functions, such as a graphics processing unit (GPU) 804, a digital signal processor (DSP) 806, a neural processing unit (NPU) 808, a multimedia processing unit 810, and a wireless connectivity component 812.

An NPU, such as 808, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 808, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 808 is a part of one or more of CPU 802, GPU 804, and/or DSP 806.

In some examples, wireless connectivity component 812 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 812 is further connected to one or more antennas 814.

Processing system 800 may also include one or more sensor processing units 816 associated with any manner of sensor, one or more image signal processors (ISPs) 818 associated with any manner of image sensor, and/or a navigation processor 820, which may include satellite-based positioning system components (e.g., GPS or GLONASS) as well as inertial positioning system components.

Processing system 800 may also include one or more input and/or output devices 822, such as screens, touch-sensitive surfaces (including touch-sensitive displays), physical buttons, speakers, microphones, and the like.

In some examples, one or more of the processors of processing system 800 may be based on an ARM or RISC-V instruction set.

Processing system 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of processing system 800.

In particular, in this example, memory 824 includes a sparsity component 824A, a weight component 824B, an aggregation component 824C, a training component 824D, and an inference component 824E. The memory 824 also includes a set of model parameters 824F (which may correspond to the parameters (e.g., weights and/or biases) of the machine learning models discussed above). The depicted components, and others not depicted, may be configured to perform various aspects of the techniques described herein. Though depicted as discrete components for conceptual clarity in FIG. 8, sparsity component 824A, weight component 824B, aggregation component 824C, training component 824D, and inference component 824E may be collectively or individually implemented in various aspects.

Processing system 800 further comprises sparsity circuit 826, weight circuit 827, aggregation circuit 828, training circuit 829, and inference circuit 830. The depicted circuits, and others not depicted, may be configured to perform various aspects of the techniques described herein.

For example, sparsity component 824A and sparsity circuit 826 may be used to extract slices of the input tensor, and identify non-sparse activation elements (and, in some aspects, indices or address offsets of these non-sparse elements), as discussed above. Weight component 824B and weight circuit 827 may be used to extract the corresponding weights for these non-sparse elements (e.g., from memory 824 and/or from a TCM), as discussed above. Aggregation component 824C and aggregation circuit 828 may generally be used to aggregate the various intermediate tensors and convolution outputs (e.g., summing the intermediate tensors 230 and/or stacking the convolution outputs 240, as discussed above with reference to FIG. 2) to generate overall convolution output. Training component 824D and training circuit 829 may be used to control training, refining, and/or fine-tuning of various machine learning models using desparsified convolution, as discussed above. Inference component 824E and inference circuit 830 may generally be use trained machine learning models to generate inferences or predictions using desparsified convolution, as discussed above.

Though depicted as separate components and circuits for clarity in FIG. 8, sparsity circuit 826, weight circuit 827, aggregation circuit 828, training circuit 829, and inference circuit 830 may collectively or individually be implemented in other processing devices of processing system 800, such as within CPU 802, GPU 804, DSP 806, NPU 808, and the like.

Generally, processing system 800 and/or components thereof may be configured to perform the methods described herein.

Notably, in other aspects, aspects of processing system 800 may be omitted, such as where processing system 800 is a server computer or the like. For example, multimedia processing unit 810, wireless connectivity component 812, sensor processing units 816, ISPs 818, and/or navigation processor 820 may be omitted in other aspects. Further, aspects of processing system 800 maybe distributed between multiple devices.

Example Clauses

Clause 1: A method, comprising: receiving an activation tensor; and generating a first convolution output for the activation tensor, comprising: identifying a first set of non-zero elements in the activation tensor; selecting a first set of weight elements, corresponding to the first set of non-zero elements, from a weight tensor; and multiplying the first set of non-zero elements and the first set of weight elements.

Clause 2: A method, comprising: receiving an activation tensor; and generating a first convolution output for the activation tensor, comprising: selecting a first subset of weight elements, corresponding to a first set of non-zero elements in the activation tensor, from a weight tensor; and multiplying the first set of non-zero elements and the first set of weight elements.

Clause 3: The method according to any one of Clauses 1-2, the method further includes identifying a set of respective indices, wherein each respective index of the set of respective indices corresponds to a respective non-zero element of the first set of non-zero elements, wherein selecting the first set of weight elements comprises retrieving the first set of weight elements based on the set of respective indices.

Clause 4: The method according to any one of Clauses 1-3, wherein retrieving the first set of weight elements based on the set of respective indices comprises: determining a set of memory offsets based on the set of respective indices, and retrieving the first set of weight elements from a memory using the set of memory offsets.

Clause 5: The method according to any one of Clauses 1-4, wherein the memory is a tightly coupled memory (TCM) having a dedicated connection to a processing core used to generate the first convolution output.

Clause 6: The method according to any one of Clauses 1-5, wherein: the first set of non-zero elements is identified within a first one-dimensional vector extracted from the activation tensor, and the first one-dimensional vector corresponds to a single spatial element across input channels in the activation tensor.

Clause 7: The method according to any one of Clauses 1-6, wherein: the first convolution output corresponds to a first application of a kernel having a height of M and a width of N, and generating the first convolution output comprises: identifying M*N sets of non-zero elements in the activation tensor; selecting M*N sets of weight elements corresponding to the M*N sets of non-zero elements; and generating a set of intermediate tensors by multiplying each of the M*N sets of weight elements with a corresponding set of non-zero elements from the M*N sets of non-zero elements.

Clause 8: The method according to any one of Clauses 1-7, wherein generating the first convolution output further comprises summing the set of intermediate tensors to yield the first convolution output.

Clause 9: The method according to any one of Clauses 1-8, further comprising: generating a second convolution output corresponding to a second application of the kernel; and generating an overall convolution output for the activation tensor by stacking the first and second convolution outputs.

Clause 10: The method according to any one of Clauses 1-9, wherein: H*W convolution outputs are generated for the activation tensor, H is a height of the activation tensor, and W is a width of the activation tensor.

Clause 11: The method according to any one of Clauses 1-10, wherein the first convolution output is generated as part of applying a convolution kernel comprising at least one of: a width dimension greater than one, or a height dimension greater than one.

Clause 12: The method according to any one of Clauses 1-11, wherein the first convolution output is generated as part of applying a convolution kernel comprising: a width dimension equal to one, and a height dimension equal to one.

Clause 13: The method according to any one of Clauses 1-12, wherein the first convolution output is generated as part of a training process for a neural network.

Clause 14: The method according to any one of Clauses 1-13, wherein the first convolution output is generated as part of generating an inference using a trained neural network.

Clause 15: A system, comprising: a memory comprising computer-executable instructions; and one or more processors configured to execute the computer-executable instructions and cause the processing system to perform a method in accordance with any one of Clauses 1-14.

Clause 16: A system, comprising means for performing a method in accordance with any one of Clauses 1-14.

Clause 17: A non-transitory computer-readable medium comprising computer-executable instructions that, when executed by one or more processors of a processing system, cause the processing system to perform a method in accordance with any one of Clauses 1-14.

Clause 18: A computer program product embodied on a computer-readable storage medium comprising code for performing a method in accordance with any one of Clauses 1-14.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory), and the like. Also, "determining" may include resolving, selecting, choosing, establishing, and the like.

As used herein, the term "connected to", in the context of sharing electronic signals and data between the elements described herein, may generally mean in data communication between the respective elements that are connected to each other. In some cases, elements may be directly connected to each other, such as via one or more conductive traces, lines, or other conductive carriers capable of carrying signals and/or data between the respective elements that are directly connected to each other. In other cases, elements may be indirectly connected to each other, such as via one or more data busses or similar shared circuitry and/or integrated circuit elements for communicating signals and data between the respective elements that are indirectly connected to each other.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:
receiving an input to a machine learning model;
generating a first convolution output based on the input, comprising:
generating an activation tensor based on the input;
selecting a first subset of weight elements, corresponding to a first set of non-zero elements in the activation tensor, from a weight tensor; and
multiplying the first set of non-zero elements and the first subset of weight elements; and
generating an output of the machine learning model based on the first convolution output.

2. The method of claim 1, further comprising identifying a set of respective indices, wherein:
each respective index of the set of respective indices corresponds to a respective non-zero element of the first set of non-zero elements, and
selecting the first subset of weight elements comprises retrieving the first subset of weight elements based on the set of respective indices.

3. The processor-implemented method of claim 2, wherein retrieving the first subset of weight elements based on the set of respective indices comprises:
determining a set of memory offsets based on the set of respective indices; and
retrieving the first subset of weight elements from a memory using the set of memory offsets.

4. The processor-implemented method of claim 1, wherein:
the first set of non-zero elements is identified within a first one-dimensional vector extracted from the activation tensor, and
the first one-dimensional vector corresponds to a single spatial element across input channels in the activation tensor.

5. The processor-implemented method of claim 4, wherein:
the first convolution output corresponds to a first application of a kernel having a height of M and a width of N, and
generating the first convolution output comprises:
identifying M*N sets of non-zero elements in the activation tensor;
selecting M*N subsets of weight elements corresponding to the M*N sets of non-zero elements; and
generating a set of intermediate tensors by multiplying each of the M*N subsets of weight elements with a corresponding set of non-zero elements from the M*N sets of non-zero elements.

6. The processor-implemented method of claim 5, wherein generating the first convolution output further comprises summing the set of intermediate tensors to yield the first convolution output.

7. The processor-implemented method of claim 5, further comprising:
generating a second convolution output corresponding to a second application of the kernel; and
generating an overall convolution output for the activation tensor by stacking the first and second convolution outputs.

8. The processor-implemented method of claim 7, wherein:
H*W convolution outputs are generated for the activation tensor,
H is a height of the activation tensor, and
W is a width of the activation tensor.

9. The processor-implemented method of claim 1, wherein the first convolution output is generated as part of applying a convolution kernel comprising at least one of:
a width dimension greater than one, or
a height dimension greater than one.

10. The processor-implemented method of claim 1, wherein the first convolution output is generated as part of applying a convolution kernel comprising:
a width dimension equal to one, and
a height dimension equal to one.

11. The processor-implemented method of claim 1, wherein the output is generated as part of a training process for a neural network.

12. The processor-implemented method of claim 1, wherein the output is generated as part of generating an inference using a trained neural network.

13. A system, comprising:
memory comprising computer-executable instructions; and
one or more processors configured to execute the computer-executable instructions and cause the system to perform an operation comprising:
receiving an input to a machine learning model;

generating a first convolution output based on the input for the activation tensor, comprising:

generating an activation tensor based on the input;

selecting a first subset of weight elements, corresponding to a first set of non-zero elements in the activation tensor, from a weight tensor; and multiplying the first set of non-zero elements and the first subset of weight elements; and generating an output of the machine learning model based on the first convolution output.

14. The system of claim 13, the operation further comprising identifying a set of respective indices, wherein:

each respective index of the set of respective indices corresponds to a respective non-zero element of the first set of non-zero elements, and selecting the first subset of weight elements comprises retrieving the first subset of weight elements based on the set of respective indices.

15. The system of claim 14, wherein retrieving the first subset of weight elements based on the set of respective indices comprises:

determining a set of memory offsets based on the set of respective indices; and retrieving the first subset of weight elements from a memory using the set of memory offsets.

16. The system of claim 15, wherein the memory is a tightly coupled memory (TCM) having a dedicated connection to a processing core used to generate the first convolution output.

17. The system of claim 13, wherein:

the first set of non-zero elements are identified within a first one-dimensional vector extracted from the activation tensor, and the first one-dimensional vector corresponds to a single spatial element across input channels in the activation tensor.

18. The system of claim 17, wherein:

the first convolution output corresponds to a first application of a kernel having a height of M and a width of N, and generating the first convolution output comprises:

identifying M*N sets of non-zero elements in the activation tensor;

selecting M*N subsets of weight elements corresponding to the M*N sets of non-zero elements; and generating a set of intermediate tensors by multiplying each of the M*N subsets of weight elements with a corresponding set of non-zero elements from the M*N sets of non-zero elements.

19. The system of claim 18, wherein generating the first convolution output further comprises summing the set of intermediate tensors to yield the first convolution output.

20. The system of claim 18, the operation further comprising:

generating a second convolution output corresponding to a second application of the kernel; and generating an overall convolution output for the activation tensor by stacking the first and second convolution outputs.

21. The system of claim 13, wherein the first convolution output is generated as part of applying a convolution kernel comprising at least one of:

a width dimension greater than one, or a height dimension greater than one.

22. The system of claim 13, wherein the first convolution output is generated as part of applying a convolution kernel comprising:

a width dimension equal to one, and a height dimension equal to one.

23. One or more non-transitory computer-readable media comprising instructions that, when executed by one or more processors of a processing system, cause the processing system to perform an operation comprising:

receiving an input to a machine learning model;

generating a first convolution output based on the input, comprising:

generating an activation tensor based on the input;

selecting a first subset of weight elements, corresponding to a first set of non-zero elements in the activation tensor, from a weight tensor; and multiplying the first set of non-zero elements and the first subset of weight elements; and generating an output of the machine learning model based on the first convolution output.

24. The non-transitory computer-readable media of claim 23, the operation further comprising identifying a set of respective indices, wherein:

each respective index of the set of respective indices corresponds to a respective non-zero element of the first set of non-zero elements, and selecting the first subset of weight elements comprises retrieving the first subset of weight elements based on the set of respective indices.

25. The non-transitory computer-readable media of claim 24, wherein retrieving the first subset of weight elements based on the set of respective indices comprises:

determining a set of memory offsets based on the set of respective indices; and retrieving the first subset of weight elements from a memory using the set of memory offsets.

26. The non-transitory computer-readable media of claim 23, wherein:

the first set of non-zero elements are identified within a first one-dimensional vector extracted from the activation tensor, and the first one-dimensional vector corresponds to a single spatial element across input channels in the activation tensor.

27. The non-transitory computer-readable media of claim 26, wherein:

the first convolution output corresponds to a first application of a kernel having a height of M and a width of N, and generating the first convolution output comprises:

identifying M*N sets of non-zero elements in the activation tensor;

selecting M*N subsets of weight elements corresponding to the M*N sets of non-zero elements; and generating a set of intermediate tensors by multiplying each of the M*N subsets of weight elements with a corresponding set of non-zero elements from the M*N sets of non-zero elements.

28. The non-transitory computer-readable media of claim 27, wherein generating the first convolution output further comprises summing the set of intermediate tensors to yield the first convolution output.

29. The non-transitory computer-readable media of claim 28, wherein generating the first convolution output further comprises summing the set of intermediate tensors to yield the first convolution output.

30. A system, comprising:

means for receiving an input to a machine learning model;

means for generating a convolution output based on the input, comprising:

means for generating an activation tensor based on the input;

means for selecting a subset of weight elements, corresponding to a set of non-zero elements in the activation tensor, from a weight tensor; and means for multiplying the set of non-zero elements and the subset of weight elements; and means for generating an output of the machine learning model based on the convolution output.

\* \* \* \* \*